United States Patent
Blanchard et al.

(10) Patent No.: US 6,408,191 B1
(45) Date of Patent: *Jun. 18, 2002

(54) ARRANGEMENT FOR DISPLAYING MESSAGE SCREENS ON A TELEPHONE TERMINAL

(75) Inventors: Harry Edward Blanchard, Rumson; Kathleen J. Chylinski, Bridgewater; David R. Dempski, Bricktown; Steven M. Herbst, Chester; Nicholas H. Katis, Aberdeen; Susan A. Palermo, Oceanport; Susan L. Tuttle, East Windsor, all of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,431

(22) Filed: Mar. 16, 1999

Related U.S. Application Data

(63) Continuation of application No. 08/775,317, filed on Dec. 31, 1996.

(51) Int. Cl.[7] .......................... H04B 1/38; H04M 11/10
(52) U.S. Cl. ........................................ 455/566; 455/412
(58) Field of Search ............................... 379/356, 93.17, 379/457, 88.11; 455/566, 564, 575, 466, 412, 464

(56) References Cited

U.S. PATENT DOCUMENTS

| | | | | |
|---|---|---|---|---|
| 4,837,811 A | * | 6/1989 | Butler et al. ............. | 379/93.17 |
| 4,872,196 A | * | 10/1989 | Royer et al. ................. | 455/564 |
| 5,095,307 A | * | 3/1992 | Shimura et al. ....... | 340/825.44 |
| 5,243,331 A | * | 9/1993 | McCausland et al. ....... | 345/172 |
| 5,371,788 A | * | 12/1994 | Baals et al. .................. | 379/396 |
| 5,392,337 A | * | 2/1995 | Baals et al. .................. | 379/457 |
| 5,412,713 A | * | 5/1995 | Baals et al. .................. | 379/457 |
| 5,425,077 A | * | 6/1995 | Tsoi ........................... | 455/566 |
| 5,487,104 A | * | 1/1996 | Baals et al. .............. | 379/93.17 |
| 5,509,048 A | * | 4/1996 | Meidan et al. .............. | 455/564 |
| 5,579,535 A | * | 11/1996 | Orlen et al. ................. | 455/421 |
| 5,604,921 A | * | 2/1997 | Alanara ........................ | 455/45 |
| 5,615,248 A | * | 3/1997 | Norimatsu ................... | 455/566 |
| 5,633,912 A | * | 5/1997 | Tsoi ........................... | 455/566 |
| 5,692,032 A | * | 11/1997 | Seppanen et al. ........... | 455/466 |
| 5,737,394 A | * | 4/1998 | Anderson et al. ........ | 379/88.11 |
| 5,752,195 A | * | 5/1998 | Tsuji et al. .................. | 455/462 |
| 5,774,540 A | * | 6/1998 | Davidson et al. ........... | 379/387 |
| 5,797,098 A | * | 8/1998 | Schroeder et al. .......... | 455/464 |
| 5,920,826 A | * | 7/1999 | Metso et al. ................. | 455/557 |
| 5,930,239 A | * | 7/1999 | Turcotte ...................... | 370/310 |
| 5,966,671 A | * | 10/1999 | Mitchell et al. ............. | 455/575 |
| 6,044,260 A | * | 3/2000 | Eaton et al. ................. | 455/406 |
| 6,047,196 A | * | 4/2000 | Makela et al. ............... | 455/556 |
| 6,125,287 A | * | 9/2000 | Cushman et al. ........... | 455/566 |
| 6,157,841 A | * | 12/2000 | Bolduc et al. .............. | 455/456 |
| 6,161,020 A | * | 12/2000 | Kim ............................ | 455/466 |

\* cited by examiner

*Primary Examiner*—Nguyen T. Vo
*Assistant Examiner*—Charles N. Appiah
(74) *Attorney, Agent, or Firm*—Priest & Goldstein, PLLC

(57) ABSTRACT

An arrangement for displaying message screens on a telephone terminal provides easy access to messages received by the telephone terminal from a service provider. The arrangement allows users to seamlessly and intuitively view header and body information of a message without the need for any unnecessary key presses.

16 Claims, 3 Drawing Sheets

ARRANGEMENT FOR DISPLAYING MESSAGE SCREENS ON A TELEPHONE TERMINAL

This is a continuation of copending application(s) Ser. No. 08/775,317 filed on Dec. 31, 1996.

BACKGROUND OF THE INVENTION

1. Technical Field

This invention is directed to telephone terminals and more particularly, to a telephone terminal configurable by a user for accessing messages available at the terminal through an interactive display arrangement.

2. Description of the Prior Art

Current trends in the design of telephone terminals indicate that more and more of telephone functionality is being integrated into the telephone display on the terminal. For example, information as to features available on the display has migrated from light emitting diodes (LEDs) to the display, and local additions such as directories, incoming caller information and the like, are all migrating to the display.

The technology presently in use in telephone displays is character-based liquid crystal device (LCD) displays. These displays are configured in various array sizes such as, for example, a 2 line by 10 character LCD display, a 3 line by 12 character LCD display and even a 4 line by 12 character LCD display. In order to be artfully incorporated into the telephone housing of some telephone terminals, by way of example, the recently introduced AT&T 3760 and 3770 wireless telephone terminals, these displays tend to be small, typically on the order of one inch in height. Also, in order to provide a reasonable number of characters for information such as caller information and directory access information, a small font size for the characters is generally used.

Wireless telephone terminals have evolved to a state where they now permit reception and storage of short messages for access by a user at his or her convenience. Such short message capability has traditionally been provided in paging devices, which alert the user upon receipt of a new message through beeping, vibrating and the like. Since in these devices this message function is usually the only one provided, the user simply presses a button whenever he or she wishes to view the messages, which are typically identified as a series of message headers.

Existing short message-capable wireless telephone terminals rely upon a "pager model" for viewing messages. Such design requires that a user of the terminal initially view a series of message headers. In order to view an entire message, the user must select a specific header in order to view the message body corresponding to that message header. Likewise, the user must take a separate action to exit from the message body level and return to the message header level. It is therefore desirable that the short message capability be incorporated in a telephone terminal in a manner that allows a user to easily access, view and manage a received message presented on a small display.

SUMMARY OF THE INVENTION

The prior art problem is solved in accordance with the present invention by providing an arrangement for displaying message screens on a telephone terminal through which easy access to messages received by the telephone terminal from a service provider is available for the user. The arrangement allows users to seamlessly and intuitively view header and body information of a message without the need for any additional, unnecessary key presses.

A set of menu keys or buttons in a user interface provides, in accordance with a first aspect of the invention, quick access to messages as well as other features of the telephone terminal with just a few key presses of these menu keys. The menu keys include a "Right" arrow key, a "Left" arrow key, an "Up" arrow key, a "Down" arrow key, a "Select" key and a "Home" key. The Right, Left, Up and Down arrow keys are functionally descriptive in moving between menu screens and advantageously provides a dual axis of control for a user in navigating among a plurality of these menu screens. The Select key selects or advances to a feature choice which is being displayed in a menu screen. Finally, the Home key is used to return a user to an original or starting menu screen in the plurality of menu screens.

In accordance with a second aspect of the invention, each message in a series of messages may be viewed by selecting a "messages menu" choice in a displayed menu. Once this messages menu choice is selected by the Select key, the message header in the displayed menu provides an enumeration for the particular message being displayed as well as a total number of messages in the series of messages. Also in the menu screen, the message body is displayed in available characters spaces on the display and below the message header. If the received message body is greater than the available character spaces of the display, a down-arrow is provided in the display to indicate that the message body continues and that additional information can be viewed by scrolling to the next screen with the Down arrow key. At any point in the message being viewed, the user may step to the next message in the series of messages by pressing the Right arrow key, which sends the user to the top of this next message. The user can use the Left and Right arrow keys in a similar fashion to step backward and forward to all messages. This dual axis of control advantageously allows a user to view the contents of a menu area without having to perform the additional step of selecting, with the Select key, each message in the area.

BRIEF DESCRIPTION OF THE DRAWING

This invention and its mode of operation will be more clearly understood from the following detailed description when read with the appended drawings in which.

Throughout the drawing, the same elements when shown in more than one figure are designated by the same reference numerals.

DETAILED DESCRIPTION

Figure 1:
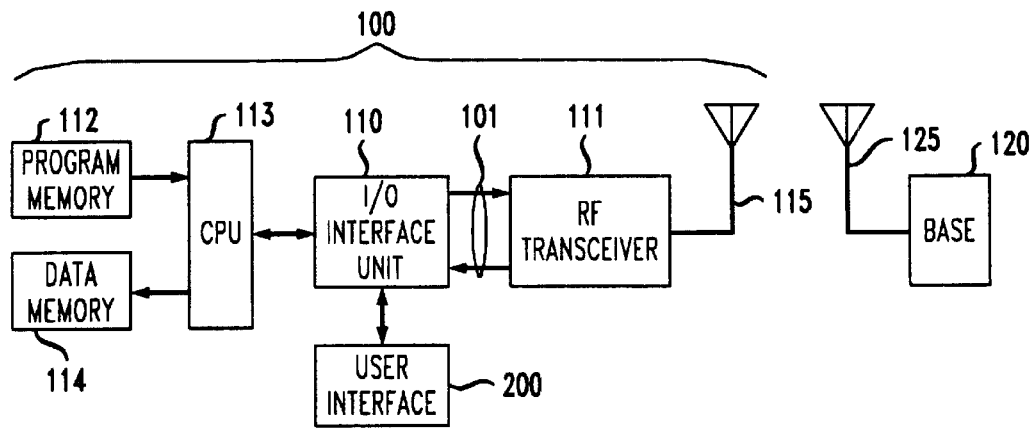
FIG. 1 is a block diagram of a wireless telephone terminal and a base unit, the telephone terminal being usable for incorporating the present invention.

Referring now to FIG. 1, there is shown an illustrative block diagram of a wireless telephone terminal 100 useful for describing the operation of the present invention. The telephone terminal is configured so that incoming messages from a service provider may be received from a base station or unit 120 and accessed or stored, as appropriate. A user of the terminal is alerted to the receipt of each of these messages and also provided easy access to these messages through a user interface 200, described in detail later herein. Examples of other user interfaces in telephone terminals are found in copending and commonly assigned U.S. patent applications, Ser. Nos. 08/559,516, 08/559,517, and 08/678,392.

The terminal includes an input/output (I/O) interface unit 110 which connects to a radio frequency (RF) transceiver 111 containing a transmitter and receiver for providing communications in, by way of illustrative example, a cellular radio system.

Various types of cellular radio systems are known in the art and have been otherwise described. One such system is described in *The Bell System Technical Journal*, Volume 58, January 1979, Number 1, particularly in papers entitled "Advanced Mobile Phone Service: Introduction, Background and Objectives" by W. R. Young and "The Cellular Concept" by V. H. MacDonald.

The RF transceiver 111 also may provide communications suitable for operating in a cordless telephone system. Such a cordless telephone system is described in U.S. Pat. Nos. 4,706,274 and 5,044,010, for example.

This I/O interface unit 110 contains switching and control circuits required by the terminal 100 for establishing, maintaining and terminating RF communications connections between terminal 100 and base unit 120. Through these circuits and via antennas 115 and 125, the terminal 100 thus sends to and receives the appropriate signals, including the incoming messages, from the base unit via the RaF transceiver 111.

The terminal 100 also includes a program memory 112 which provides instructions to a central processor unit (CPU) 113 for controlling the various operating features and functions originating at the terminal. This program memory 112 contains data for interpreting a plurality of codes representative of various control signals received from the base unit 120 and for generating codes to be transmitted to the base unit 120. A data memory 114 is utilized by the CPU 113 for storing and accessing data associated with performing the various functions and features programmed in the program memory 112. In the described embodiment, CPU 113 is a microprocessor, program memory 112 is a read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

A messaging service is advantageously employed in a wireless system since a user or subscriber of a wireless telephone terminal may not be available when a caller attempts to reach him or her through a regular wireless telephone call. Through use of the messaging service, the caller is able to leave a short message that will be received by the subscriber when he or she "resurfaces" or becomes available at the telephone terminal. A messaging service known as Short Message Service (SMS) is presently available from AT&T Corp. in the AT&T AUTOPLEX (R) System-1000.

The SMS message is a feature that is incorporated in a message center (not shown) that is part of the overall cellular system. In achieving the SMS message feature, the message center provides a voice mail functionality which enables the message center to play an announcement that prompts a caller to leave a SMS message. A store and forward functionality also is provided in the message center. This store and forward functionality enables the message center to forward the SMS message to the telephone terminal at the appropriate time for conveying it to the user of the telephone terminal.

In order to suitably illustrate the SMS feature, the following descriptive operation for this feature is provided.

1. A caller from a wireless telephone terminal or a land-based station makes a call to a subscriber with a wireless telephone terminal who subscribes to the SMS feature.
2. The SMS subscriber's telephone terminal alerts the subscriber, but for some reason, the subscriber does not answer. If the subscriber is made aware of the incoming call and wishes to reroute the call to the message center, the subscriber needs only to press a send key 229 on the telephone terminal. Alternatively, if the telephone terminal of the subscriber happens to be in the OFF state when the call is made, the call is automatically rerouted to the message center.
3. When the call is received at the message center, the message center greets the caller and makes a suitable announcement such as: Please press 1 if you would like to leave a Spoken Voice Message, or Please press 2 if you would like to have your Party Paged, or Please press 3 if you would like to leave a Short Alphanumeric Message.
4. If the caller presses "1", and chooses to leave a Spoken Voice Message, then the caller is prompted to do so "at the tone." The called party is then appraised of pending voice messages via voice mail notification or Message Waiting indication. The called party is then expected to call into the voice mail notification and access the voice mail.
5. If the caller presses "2", and chooses to have his or her party paged, then the caller is prompted to enter via the keypad a "Reach Me" number. This will be delivered for display as, for example, "Please call 234-5678" when the called party resurfaces and responds to a page. The called party is then expected to call the "Reach Me" number.
6. If the caller presses "3", and chooses to leave a personalized Short Alphanumeric Message, then the caller is connected to a human attendant, who will transcribe the message into text which will be typically equal to 220 characters. This text is then stored at the message center.
7. When the called party resurfaces, a home location register (not shown) in the cellular system notifies the message center.
8. The message center forwards the SMS/Paging information to the SMS subscriber.
9. For the SMS subscriber whose telephone terminal is in the idle state, the SMS/Paging information is conveyed to the telephone terminal and an alerting signal is generated in the terminal. This alerting signal times out after about three seconds after the SMS/Paging message is sent to the telephone terminal.
10. For the SMS subscriber whose telephone terminal is in the talk state, and if that telephone is an analog telephone, then a type of call waiting is invoked which allows the called party to receive an indication of the SMS/Paging information at the terminal. If the telephone terminal is a digital telephone, i.e., code division multiple access (CDMA) or time division multiple access (TDMA), then the SMS/Paging signal is received in the terminal independent of the state of the terminal. Beep tones are provided to the SMS subscriber, thus bringing attention to this delivery.

11. While the telephone terminal is in either the idle or talk state, the subscriber is able to view the SMS/Paging message.

Figure 2:
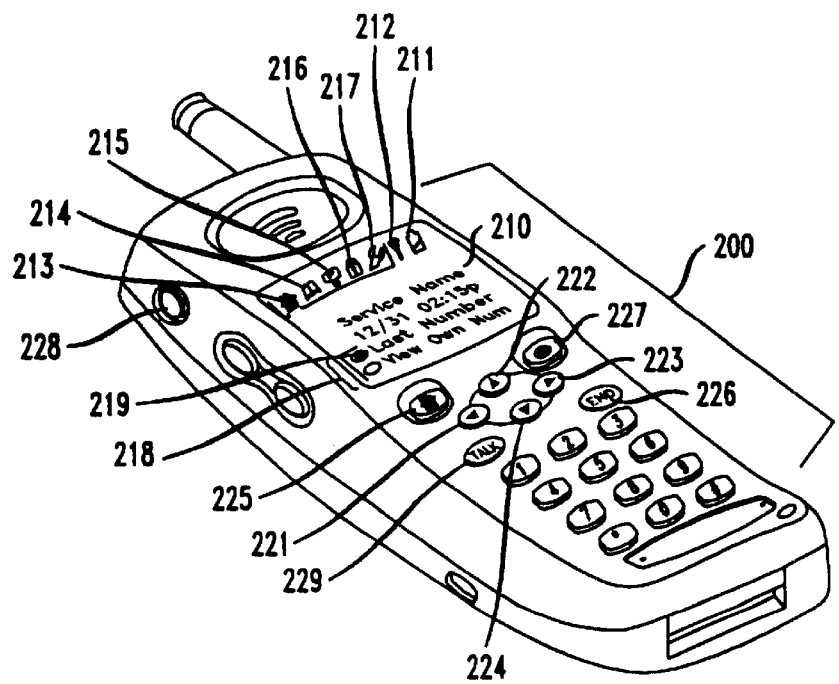
FIG. 2 illustrates the telephone terminal of FIG. 1 including a user interactive display displaying a first menu screen accessible in accordance with the present invention.

With reference now to FIG. 2, the user interface 200 comprises a user interactive display 210 which includes a number of Icon screen display symbols. Such screen display symbols include a battery level symbol 211, a signal strength symbol 212, a Home symbol 213, a Phone Book symbol 214, a Mailbox symbol 215, a Lock symbol 216 and a Tools symbol 217.

The battery level symbol 211 consists of four battery icons or symbols for showing the battery power level. At full charge, all symbols are filled-in. As the battery loses power, the filled-in part of each one of the symbols is removed from top to bottom leaving only the symbol outline. When only one filled-in symbol remains, it is an indication to the user to recharge the battery. The signal strength symbol 212 provides an indication of the received signal strength. The radiating portion of this symbol appears largest when the received signal is strong and becomes smaller as the received signal becomes weaker.

Also shown in the user interface 200 is a set of menu keys or buttons which provides, in accordance with the disclosed embodiment, quick access to all of the features of the telephone terminal with just a few key presses of these menu keys. The menu keys include a "Left" arrow key 221, a "Up" key 222, a "Right" arrow key 223, a "Down" arrow key 224, a "Home" key 225 and a "Select" key 227 which are functionally descriptive in moving between menu screens. These directional keys provide a dual axis of control for a user in navigating among a plurality of these menu screens. The Select key 227 selects the feature which is being displayed along the side of the filled-in oval outline. The Home key 225 is used to return a user to the original starting screen in the plurality of display screens. Other well-known keys or buttons: a "Talk" or send key 229, an "End" key 226 and a "Power" key 228, as well as others illustrated in the form of a dial pad, are also part of the telephone terminal shown in FIG. 2 but are conventional keys and need not be described in detail herein, except to indicate that, in a cellular system, the Talk key 229 and the End key 226 are used to respectively send a just-entered or stored telephone number to a base unit and to terminate an established conversation.

The screen display changes dynamically as the user performs functions and makes selections via the Select key 227. Shown in the display 210 is just one menu screen in the hierarchically arranged menu. The illustrated entry is one of possible original starting screens or the "Home Screen" which is conveniently provided for a user whenever the telephone terminal is turned ON from an OFF state or returned to its standby state after the user presses the End key 226, terminating a telephone call.

The Icon Home symbol 213, the Icon Phone Book symbol 214, the Icon Mailbox symbol 215, the Icon Lock symbol 216 and the Icon Tools symbol 216 are associated with parent menu screens which are at the top level in the hierarchical display. When the wireless terminal is turned on with the power key 228, the Home symbol 213 and its two selectable features from this level are provided in the Home Screen display or display 210. Also shown in this display is the name of the service provider that provides the user with cellular service and, optionally, time and date information.

The Phone Book symbol 214 is associated with a parent screen display for sub-menu displays in which telephone numbers are added or deleted, viewed or retrieved as appropriate by a terminal user. The Mailbox symbol 215 is associated with a parent screen display for sub-menu displays in which voice messages, test messages and call logs (incoming and outgoing) are accessed. The Lock symbol 216 is associated with a parent screen display for sub-menu displays through which security is provided for the terminal device. Display screens such as Phone Locks, Call Blocks, Phone Book Access and Mailbox access are accessed from this parent screen. The Tools symbol 217 is associated with a parent screen display for sub-menu displays through phone settings, call options and service options which are set by a user or representative of the service provider, as appropriate.

A user easily and intuitively advances among the parent menu screens by using the Right and Left arrow keys 223 and 225. As the user cycles among these screens, the Icon screen display symbol that is associated with the selected parent screen is filled-in or darkened thereby informing the user just which one of the top menu options is active. From either of the parent menu screens at the top level in the hierarchical display, the Down arrow key 224 moves down through the selectable sub-level menu choices and cycles at the bottom, back to the first entry of the sub-level menu choices. In order to access one of the sub-level menu choices, the user must select into the desired sublevel menu choice, with the Select key 227. While in a sub-level menu choice, should the user desire to move directly up in this menu choice, the Up arrow key 222 is used to take the user up through this choice and back to the parent screen. The simplicity of the user interface is that all features illustrated by the display screens herein are accessible through the use of the directional keys and the select key. Although all are not shown, each one of the equal level menu choices represented by menu screen displays 210, 320, 330, 340 and 350 provide a number of selectable optional screens that may be selected by the user of the telephone terminal 100.

The user interactive display 210 also includes a menu level indicator 218. This menu level indicator includes both upper and lower brackets and also a plurality of symbols comprising elliptical or oval shaped outlines enclosed in the brackets and aligned in a column on a side of the screen display. Selective use of the brackets advantageously provide an indication to the user that all selectable choices are available on the displayed screen or that one or more selectable choices are not shown on the displayed screen. Specifically, an open or missing bracket at the bottom of the menu level indicator 218 provides an indication to the user that there are additional choices off-screen and that the user may scroll down to these choices with the Down arrow key 224. An example of the menu level indicator with an open bracket at the bottom is shown in the display screen 210. An open or missing bracket at the top of the menu level indicator 218 provides an indication to the user that there are additional choices off-screen and that the user may scroll up to these choices with the Up arrow key 222. A closed bracket indicates that the display screen includes all of the selectable choices.

The Menu options or selectable features accessible for display and other information, to be described later herein, are provided by the filled-in oval shaped outline. When selectable menu options are being displayed on the menu screen, only one oval shaped outline is filled in for indicating to the user the one option that will then be selected when the Select key 227 is pressed. The level indicator 218 thus informs a user just which one of the menu options is currently active and may be selected by the dark or filled-in oval shaped outline next to a menu screen option. As shown in screen display 210, for example, a user may select the last number dialed by depressing the Select key 227 since the filled in oval 219 is adjacent to the "Last Number" screen display option. A user may also advance to the "View Own Num" screen display option by depressing first the Down arrow key 224 and then the Select key 227. Once the user of the telephone terminal has decided which menu choice he or she wishes to explore, the directional arrow keys 221, 222, 223 and 224 are used to place the darkened oval next to that choice on the display and the Select key 227 is then pressed to select that menu choice.

While the embodiment of the present invention is illustratively described as incorporated into a wireless telephone terminal, it should be recognized that the present command-operated terminal could be utilized in other program-controlled systems such as wired telephone terminals. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in FIG. 1; the display screen shown in FIG. 2; and the display screen flow diagrams of FIGS. 3 and 4 which, taken together, describe the logical steps and the various parameters required to implement the present invention.

Figure 3:
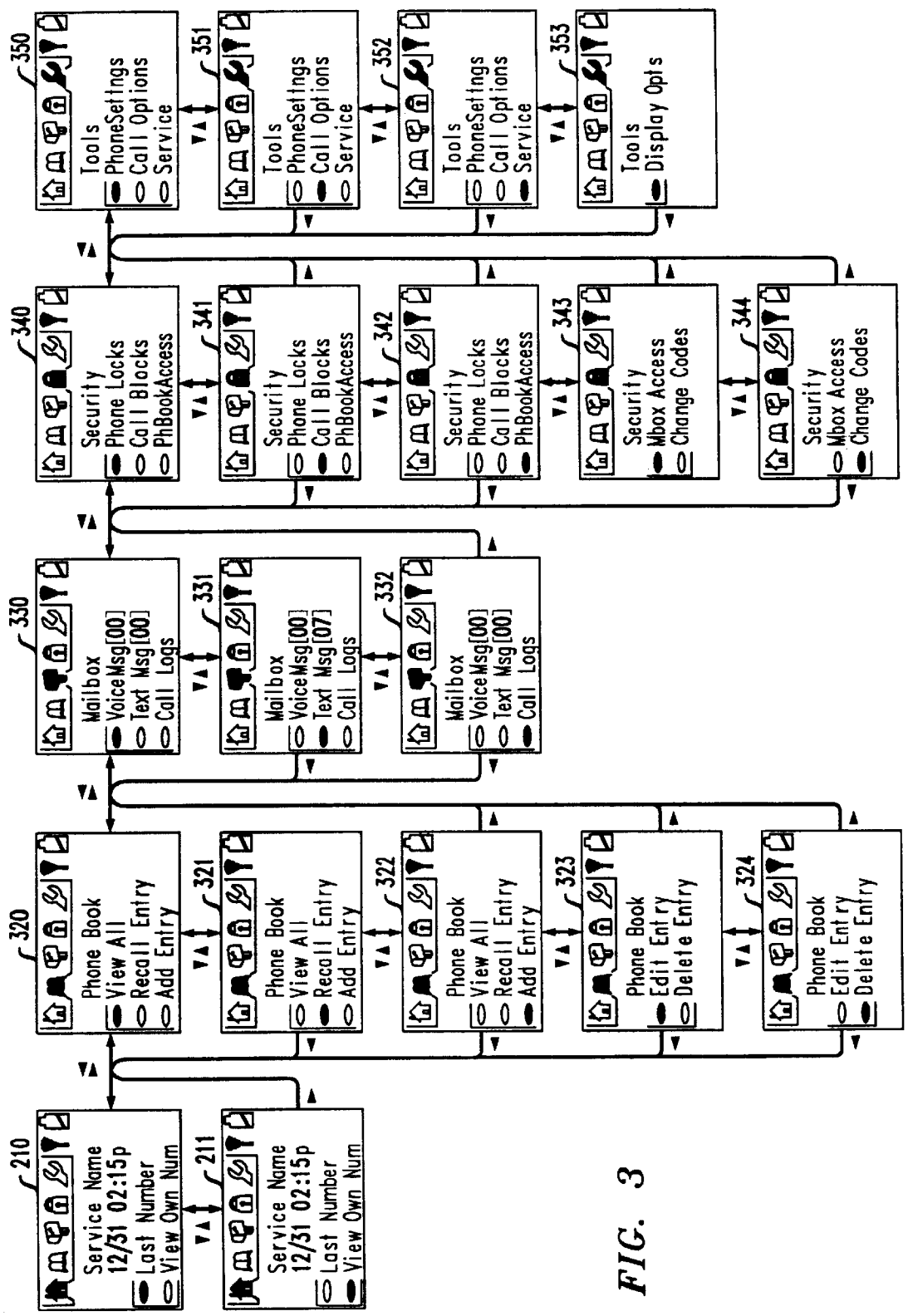
FIGS. 3 and 4 are flow charts of the invention illustrating some of the display screens provided by the circuitry shown in FIG. 1 and also illustrating how movement between these display screens is achieved, in accordance with the invention.
Figure 4:
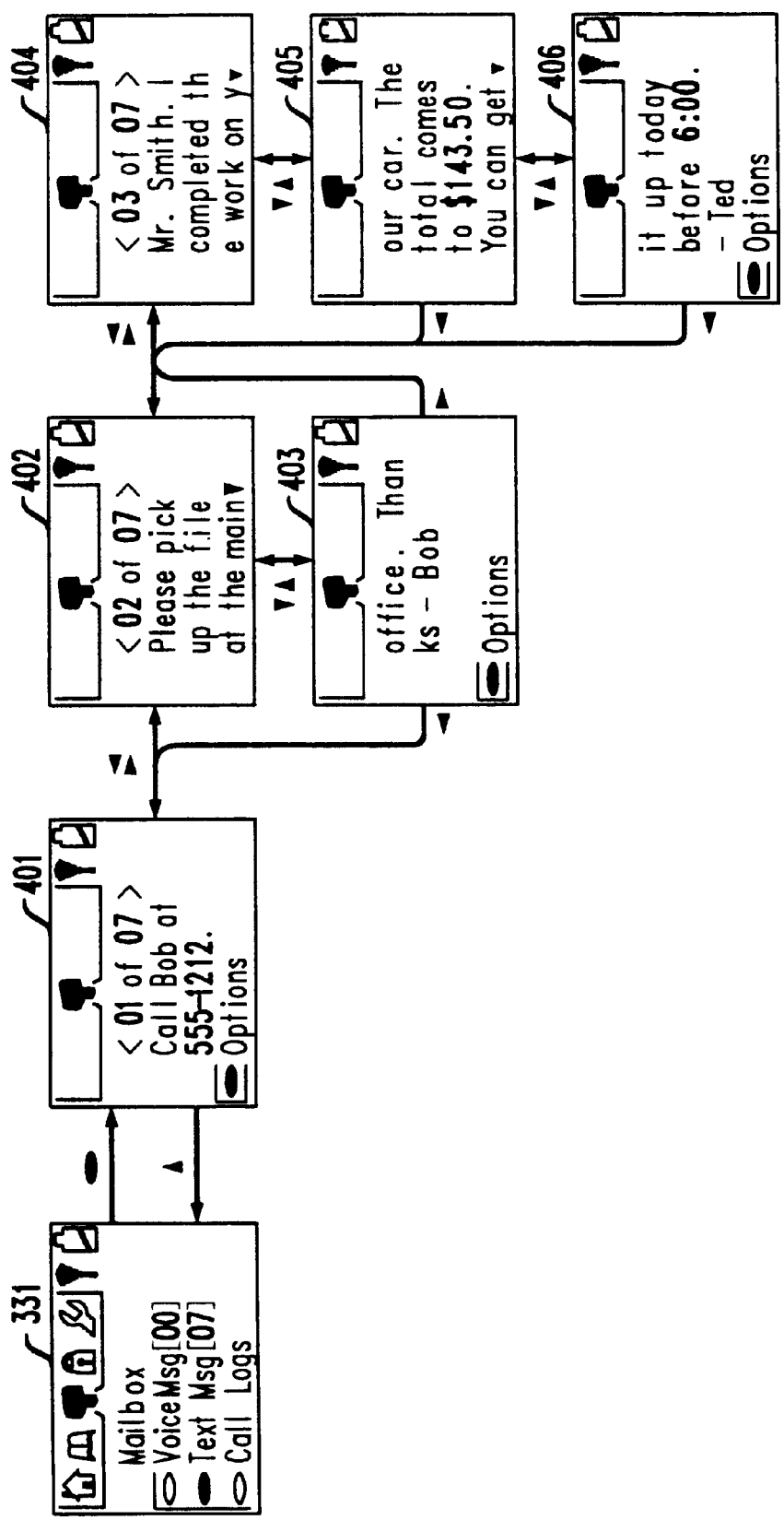

FIG. 3 shows a flow chart for illustrating some of the display screens provided by the circuitry in FIG. 1 and produced in the interactive display in the same manner as illustratively shown in display 210 in FIG. 2. These display screens, along with those shown in FIG. 4, are illustratively embodied in a 4-line by 12 character LCD display. The sequence in which these display screens are provided is indicated by the flow chart, and is shown in sufficient detail to permit one skilled in the art to duplicate the circuitry of FIG. 1, either by programming a microprocessor or by special purpose logic circuitry such as is available in a digital signal processor.

The display screens shown in FIG. 3 are of the five parent screens 210, 320, 330, 340 and 350 or main areas on the top level of the menu. For general navigation on this top level of the menu, the user uses the Right or Left arrow keys 223 or 221 to move across the five main areas of the display, which are, the Home screen, where manual calls are placed, the Phone Book, Mail Box, Lock, and Tools.

For ease of understanding the flow charts shown in both FIGS. 3 and 4 and movement between the display screens shown therein, filled-in or darkened directional triangles, which respectively represent the four directional arrow keys, are employed. Thus, by way of example, movement between the display screen 210 and display screen 320 may be accomplished by pressing the right arrow key 223, which also has an image of a right-facing triangle located thereon. Similarly, movement between the display screen 320 and display screen 210 may be accomplished by pressing the left arrow key 225, which also has an image of a left-facing triangle located thereon. Movement between display screen 320 and display screen 321 is achieved in a similar manner, only using up-facing and down-facing triangles which respectively correspond to the up arrow key 222 and the down arrow key 224. For further ease of understanding, these directional triangles are positioned near interconnecting lines that extend to those display screens between which the user is able to navigate.

When navigation between screens requires that the user press the Select key 227, a filled-in elliptical or oval shaped outline is positioned near the interconnecting line that requires this key press. Thus, for example, to move from menu screen 331 to menu screen 401 requires pressing the Select key 227. And this filled in oval shaped outline is conveniently provided on the top surface of the Select Key 227.

With reference now to navigating in the parent screens, and starting from the Home display screen 210, the user can press the Right arrow key 223, for example, to move across to the Phone Book screen 320 and see the first three selectable features of the Phone Book. Here the Up and Down arrow keys 222 and 224 can be used to move the darkened elliptical cursor to any of the Phone Book features as shown in screens 320 through 323 and the Select key 227 can then be used to choose a feature. The Right arrow key 223 again allows movement to the next area of the interface, the Mail Box screen 330 where the three features of the Mailbox screen can be viewed and accessed. Another press of the Right arrow key moves the user to the Locks screen 340 where features shown in screens 340 through 344 are accessed. Yet another press of the Right arrow key moves the user to the Tools screen 350 where features shown in the screens 350 through 353 are accessed. One last press of the Right arrow key moves the user to the home screen 210 once again. As the user moves to each of the parent screens, the outline of the Icon associated with that parent screen is darkened. Thus the user always knows which main area is being accessed.

The flow chart in FIG. 4 shows how a received message is accessed in the telephone terminal while the terminal is in the idle or standby state. Once a message has arrived and the user desires to access this message, the user simply presses the Right or Left arrow key, as appropriate, to get to the Mailbox screen 330, shown in FIG. 3, and then the Down arrow key 224 to position the darkened oval next to the text message option as shown in display screen 331, this screen being shown in FIGS. 3 and 4. From here, the user then presses the Select key 227 to view a text message log which contains not only the recently received message but also any previously stored and not deleted messages, typically up to 30. By pressing the select key 227 at this point, the user is taken to the first message screen display which shows the most recently received message. Having selected into the message log, the user is now also able to view other messages in this message log, as desired.

Once the user enters the text message log through the menu he or she is placed into the first message, for example, message screen display 401 which is labeled 01 of 07. The message shown in this screen display 401 is short and has no additional information beyond that shown in display 401. By pressing the Select key at the screen display 401, the user is provided the options of Storing the number, Seeing a long number and Sending DTMF tones to the far end. Such operation is described in copending U.S. application Ser. No. 08/559,516. The Select option is similarly available at screens 402 through 406. The user also may press the Right arrow key 223 to view the next message which is labeled 02 of 07. At this message screen display 402, the user has two options with respect to viewing new information. The first one is that he or she can use the Right arrow key 223 to scroll to message 03 as shown in message screen display 404, or he or she can use the Down arrow key 224 to scroll to the remainder of message 02, as shown in screen display 403. At any point while reading message 2 the user can press the Right arrow key 223 to view message 3, and then the Down arrow key 224 to view the remainder of message 3 or, while viewing message 3, the Right arrow key 223 at any time for viewing message 4 (not shown) and the other received messages. The left and up arrow keys 221 and 222 are also valid at all times, the Left arrow key 221 allowing the user to scroll to the previous message and the Up arrow key 222 allowing the user to scroll to previous pages of the current message.

In the disclosed embodiment of the invention, the user may not only use the Up and Down arrow keys to scroll through one message at a time, but also may use the Right and Left arrow keys to scroll between messages at anytime during the reading process. There is never a need to "Select into" a message since all messages are already in the reading mode. Thus, the short message capability is incorporated into the telephone terminal in a manner that allows a user to easily access, view and manage a received message presented on a small display.

Once the user has completed viewing the desired portion of the text message log, the user may be returned to the Home screen or screen display 210 by pressing the Home key 225. The user may also be returned to this Home screen through a process described in U.S. Pat. No. 5,371,788 which issued on Dec. 6, 1994. Alternatively, the user may return to the parent screen or Mailbox screen display 331 through the combined use of the Left or Up arrow keys 225 or 222, as appropriate. From this screen display 331, the user may navigate to any of the other equal-level parent screen displays, as earlier described herein.

What has been described is merely illustrative of the present invention. Other applications to telephone, computer or other user-interactive systems other than the disclosed system are contemplated as being within the knowledge of one skilled in the art. Thus it is to be understood that the disclosed user interface may be utilized in displays and applications, other than those specifically described herein, without departing from the spirit and scope of the present invention.

What is claimed is:

1. An arrangement for configuring a wireless telephone terminal for accessing text messages received by the telephone terminal from a base station and displayable at the terminal, the arrangement comprising:
   means for receiving in said telephone terminal a plurality of text messages from a base station;
   means for storing in said telephone terminal the plurality of text messages from the base station;
   multiple message display screens in a plurality of menu screens;
   means for selecting for viewing a first one of said multiple message display screens corresponding to one of said plurality of text messages;
   a plurality of button means for accessing each one of said multiple message display screens, a first and second one of the plurality of button means providing a means for moving from a displayed first message screen at a first selectable level to a second and subsequent message screens at said first selectable level and back to said displayed first message screen; and
   means for viewing at least a portion of each text message contained in each message display screen when said display screen is accessed.

2. The arrangement of claim 1 wherein the plurality of button means includes a third button means for moving from said displayed first message screen at said first selectable level to said displayed first message screen at a second selectable level.

3. The arrangement of claim 2 wherein the third button means moves said displayed first message screen at said second selectable level to said displayed first message screen at a third selectable level.

4. The arrangement of claim 2 wherein the plurality of button means includes a fourth button means for moving from said displayed first message screen at said second selectable level to said second message screen at said first selectable level.

5. The arrangement of claim 1 wherein said plurality of button means comprise left, right, up, down and select buttons.

6. The arrangement of claim 5 wherein pressing the down button causes the means for viewing to scroll down.

7. The arrangement of claim 5 wherein the left and right buttons correspond to the first and second one of the plurality of buttons means and pressing said left and right buttons causes movement from a first text message from the base station to a second text message from the base station without additional button presses.

8. The arrangement of claim 1 further comprising a menu level indicator which indicates additional material for a particular message display screen is located offscreen.

9. The arrangement of claim 1 wherein the plurality of menu screens are hierarchically arranged and a home button is provided which operates to return the display screen to a first level of a hierarchical arrangement for a particular message display screen.

10. The arrangement of claim 1 wherein each message display screen further comprises an indicator which informs a user of an active menu item.

11. A method of configuring a wireless telephone terminal for accessing text messages displayable at the terminal, the method comprising the steps of:
    receiving in said telephone terminal a plurality of text messages from a base station;
    storing in said telephone terminal the plurality of text messages from the base station;
    providing multiple message display screens in a plurality of menu screens;
    selecting for viewing a first one of said multiple message display screens corresponding to at least one of said plurality of text messages;
    accessing each one of said multiple message display screens with a first and second one of a plurality of buttons, the accessing step including moving from a displayed first message screen at a first selectable level to a second and subsequent message screens at said first selectable level and back to said displayed first message screen; and
    viewing at least a portion of each text message contained in each message display screen when said display screen is accessed.

12. The method of claim 11 wherein the accessing step further includes the step of moving from said displayed first message screen at said first selectable level to said displayed first message screen at a second selectable level with a third one of the plurality of buttons.

13. The method of claim 12 wherein the accessing step further includes the step of moving said displayed first message screen at said second selectable level to said displayed first message screen at a third selectable level with said third one of the plurality of buttons.

14. The method of claim 12 wherein the accessing step further includes the step of moving from said displayed first message screen for moving from said displayed first message screen at said second selectable level to said second message screen at said first selectable level with a fourth one of the plurality of buttons.

15. An arrangement for configuring a wireless telephone terminal for accessing text messages displayable at the terminal, the arrangement comprising:

means for receiving in said telephone terminal a plurality of text messages from a base station;

multiple message display screens in a plurality of menu screens;

means for selecting for viewing a first one of said multiple message display screens corresponding to one of said plurality of text messages;

a plurality of button means for accessing each one of said multiple message display screens, a first and second one of the plurality of button means providing a means for moving from a displayed first message screen at a first selectable level to a second and subsequent message screens at said first selectable level and back to said displayed first message screen without operation of any other telephone terminal input; and means for viewing at least a portion of each text message contained in each message display screen when said display screen is accessed.

16. A method of configuring a wireless telephone terminal for accessing text messages displayable at the terminal, the method comprising the steps of:

receiving in said telephone terminal a plurality of text messages from a base station;

providing multiple message display screens in a plurality of menu screens;

selecting for viewing a first one of said multiple message display screens corresponding to at least one of said plurality of text messages;

accessing each one of said multiple message display screens with a first and second one of a plurality of buttons, the accessing step including moving from a displayed first message screen at a first selectable level to a second and subsequent message screens at said first selectable level and back to said displayed first message screen without operation of any other telephone terminal input; and viewing at least a portion of each text message contained in each message display screen when said display screen is accessed.

* * * * *